United States Patent [19]

Ward

[11] 3,820,441

[45] June 28, 1974

[54] PNEUMATIC STARTER MODULATOR VALVE MEANS INCLUDING LUBRICATING MEANS FOR PNEUMATICALLY DRIVEN MOTORS

[75] Inventor: Harold L. Ward, Dunlap, Ill.

[73] Assignee: Caterpillar Tractor Co., Peoria, Ill.

[22] Filed: Feb. 23, 1973

[21] Appl. No.: 335,133

Related U.S. Application Data

[62] Division of Ser. No. 76,019, Sept. 28, 1970, abandoned.

[52] U.S. Cl. ................................. 91/46, 184/7 D
[51] Int. Cl. ............................................... F01m 1/04
[58] Field of Search ............... 91/459, 461, 304, 46; 251/30, 43; 184/7 D; 137/491, 504

[56] References Cited
UNITED STATES PATENTS

| | | | |
|---|---|---|---|
| 2,919,714 | 1/1960 | Mrazek | 251/30 X |
| 2,943,636 | 7/1960 | Reed et al. | 251/43 X |
| 3,130,818 | 4/1964 | Smith et al. | 91/46 |
| 3,206,158 | 9/1965 | Bloomquist | 251/43 X |
| 3,515,165 | 6/1970 | Zadoo | 137/491 |

FOREIGN PATENTS OR APPLICATIONS

| 1,244,965 | 9/1960 | France | 251/43 |
|---|---|---|---|

*Primary Examiner*—Irwin C. Cohen
*Attorney, Agent, or Firm*—Phillips, Moore, Weissenberger, Lempio & Strabala

[57] ABSTRACT

A compact pneumatic starter modulator including valve assembly means which provides the features and associated functions of actuating, regulating and conditioning pressurized air introduced from an air source to an air driven unit. The actuating feature of the valve assembly employs differentially loaded actuating valve means wherein selectively introducing pressurized air thereto maintains the valve body in the closed position. Trigger means integral with the valve assembly means unbalances the differential loading to open the valve assembly means. Other valve means within the valve assembly means cooperate therewith to provide for regulating the air pressure delivered to the driven unit via the valve assembly means. In addition, third valve means is included within the combination, which integrally cooperates with the regulating valve means, to introduce selectable quantities of lubricating or conditioning fluid to the air delivered to the driven unit via the valve assembly means.

4 Claims, 2 Drawing Figures

PATENTED JUN 28 1974 3,820,441
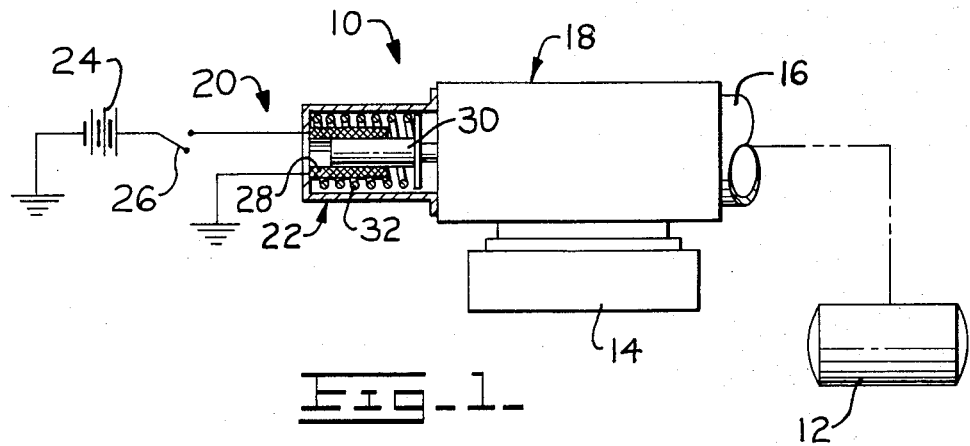
Fig-1-
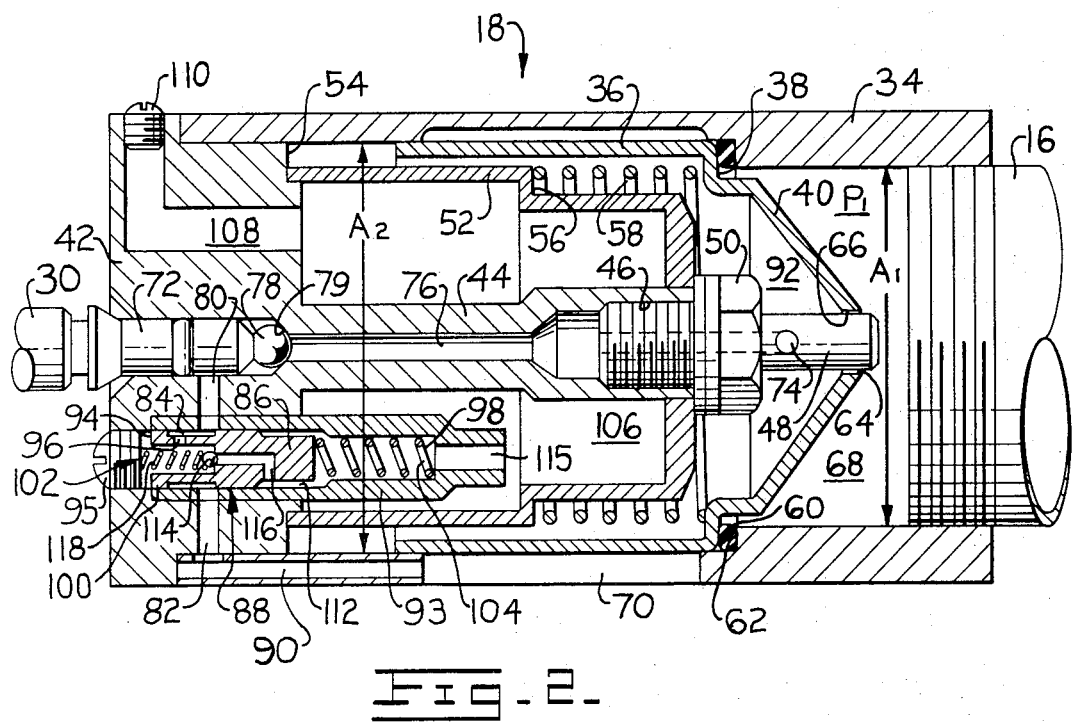
Fig-2-

PNEUMATIC STARTER MODULATOR VALVE MEANS INCLUDING LUBRICATING MEANS FOR PNEUMATICALLY DRIVEN MOTORS

REFERENCE TO RELATED APPLICATION

This application is a divisional of my co-pending U.S. Pat. application, Ser. No. 76,019, filed Sept. 28, 1970, now abandoned.

BACKGROUND OF THE INVENTION

1. Field

The invention relates to a mechanism for providing a pressurized medium for actuating a pneumatically driven unit, and particularly to a valve combination wherein reduced effort is required to trigger the mechanism and wherein several valve functions are cooperatively performed.

2. Prior Art

Various pneumatically driven units, and especially air starting units for engines, utilize a plurality of valves to obtain the required control of the driven unit. By way of example, such an air driven system may include a tank or source of compressed air, coupled to an air driven unit such as an air driven starting engine, via a whistle valve for activating the system, a regulator valve for controlling the air pressure delivered to the air driven unit, and (in certain applications) a lubricator valve to provide for the lubrication of components on the down-stream side of the air circuit. As may be seen, such an installation requires three separate valve assemblies and all the associated plumbing to and from each assembly.

There are several disadvantages in such a system. For example, excessive pressure or force is required to actuate the whistle valve since it is exposed directly to the tank pressure and is actuated manually against that pressure. Thus if the valve has one square inch of area exposed to 150 PSI tank pressure, 150 pounds of force is required to open the valve. This particular disadvantage leads to further difficulties when a remotely mounted installation is desired, since it is obviously difficult to readily transmit the large force required to actuate the valve over any extended distance. In addition, the plumbing required to assemble the separate, distinct valves in the system, adds to the cost of installation.

SUMMARY OF THE INVENTION

The invention provides a compact valve combination, which performs the functions of the whistle valve and the regulator valve of the prior art described briefly supra, and further contemplates another valve in integral combination therewith which performs the lubricating function of the third separate valve employed in the prior art.

To this end, the invention provides valve assembly means which, when activated via trigger means, introduces air under selected pressure from an air source to an air driven unit. The valve assembly means further includes differentially loaded, actuating valve means which is exposed at its input to the pressurized air source. The actuating valve means is maintained in the closed position by the differential loading feature wherein a "rear" area behind the valve, which is greater than a "front" area at the input to the valve assembly means, are both subjected to the pressurized air source. The resulting larger force on the rear area maintains the actuating valve means in a sealed condition. Energizing the trigger means increases the front area exposed to the pressurized air source, thereby unbalancing the differential loading of the valve and subsequently opening the valve assembly means.

Air pressure regulating means integral within the valve assembly means is provided to selectively vary the position of the actuating valve means and thus the pressure of the air supplied to the air driven unit. Further, air lubricating or conditioning means may be included integral within the valve assembly means, to introduce a selected amount of lubricant to the air delivered to the driven unit, at chosen periods of the valve assembly means operating cycle.

BRIEF DESCRIPTION OF THE DRAWING

FIG. 1 is a block diagram of an air starting system for engines, showing one application of the pneumatic starter modulator, including by way of example only, one means for triggering.

FIG. 2 is a cross section of a valve assembly means of the invention modulator depicted in the air starting system of FIG. 1.

DESCRIPTION OF THE PREFERRED EMBODIMENT

FIG. 1 depicts a pneumatic starter modulator 10 of the invention, in partial cross section, as utilized in an air starting system for introducing pressurized air from an air source 12 to an air driven unit 14 via a pipe 16. The modulator 10 includes valve assembly means 18 and integrally associated trigger means 20 exemplified herein as solenoid means 22 energized via a battery 24 when a switch 26 is closed to complete the circuit. When trigger means 20 is energized solenoid coils 28 pull an armature 30 away from the valve assembly means 18 which actuates the valve mechanism of the means 18, as further described below with reference to FIG. 2. The solenoid means 22 includes a spring 32 which urges the armature 30 back toward the valve assembly means 18 to close the valve mechanism thereof when the switch 26 is opened.

Referring now to FIG. 2, there is shown in greater detail, the internal combination of valve mechanisms within the valve assembly means 18 in accordance with the invention. The pipe 16 is threadably secured through a valve assembly housing 34 of the valve assembly means 18. Air pressure from the air source 12 herein termed $P_1$ acts as a "front" area $A_1$ of a valve body 36. Valve body 36 reciprocates within housing 34 and is provided with an annular seal seat shoulder 38, and a coaxially extending conical portion 40.

An end cover 42 is welded, threaded, or otherwise secured in sealed relation, coaxially within the end of valve assembly housing 34 opposite the end secured to the pipe 16. A coaxially extending member 44 is integrally formed with the end cover 42, and is internally bored and threaded as at 46 to receive an externally threaded end of a guide rod 48. The guide rod 48 has radially expanded nut portion 50, which when tightened bears against a radial portion of a cup-shaped member 52, the open end of which bears against a shoulder 54 in the end cover 42.

The member 52 has a circumferentially extending shoulder 56 adapted to receive one end of a spring 58, the other end of the spring bearing against the flared portion of the valve body 36 which defines the seal seat shoulder 38. The opposing surface of the seal seat shoulder 38 bears against seal means 60, depicted here as an "0" ring, which is confined by an internal annular seal seat shoulder 62 in the valve assembly housing 34.

An orifice 64 is provided by a loose fit between the outside circumference of the guide rod 48 and the confronting surface of a bore 66 in the center of the conical portion 40. Orifice 64 permits air under pressure $P_1$ to flow at a controlled rate to the rear side of the valve body 36. Thus air under pressure $P_1$ acts against a "rear" area $A_2$. Since rear area $A_2$ is greater than the front area $A_1$, and is acted upon by the same pressure $P_1$, the reciprocatable valve body 36 is forced towards the pipe 16. The seal means 60 is confined between the seal seat shoulder 38 and the confronting housing seal seat shoulder 62, preventing the flow of air from a chamber 68 connected to the air source 12, to an outlet port 70 communicating with the air driven unit 14.

Air under pressure $P_1$, acting on rear area $A_2$, communicates with a trigger valve 72 through a radial passage 74 in the guide rod 48, and a communicating passage 76 extending axially within the coaxially extending member 44 of the end cover 42. A seal ball 78 provides the sealing action against a bevelled shoulder 79 in the passage 76.

As previously noted, energizing the solenoid means 22 moves the armature 30 thereof to the left, causing displacement of the seal ball 78 from its sealing position against the bevelled shoulder 79. This provides communication between a radial passage 80 in the end cover 42 and the passage 76. Passage 80 then communicates with another radial passage 82, via an annular groove 84 formed about a valve body 86, of pressure regulator valve means 88, further described hereinbelow. Passage 82 communicates with an axially extending passage 90 formed within the wall of housing 34, which, in turn, opens into the outlet port 70. Note that the areas of passages 76, 80, 82, 90 and annular groove 84 are chosen to provide a cross-sectional area which is larger than the cross-sectional area provided by the orifice 64.

Accordingly, when the trigger valve 72 is actuated, a greater flow of air is permitted from a chamber 92 to the outlet port 70 via the interconnecting passages 74, 76, 80, 82, 84 and 90 than can enter from the chamber 68 to the chamber 92 through the orifice 64. It follows that the force caused by the air pressure acting on the rear area $A_2$ becomes less than the force caused by the air pressure acting on $A_1$, whereby the valve body 36 is translated from its sealed position against the seal means 60. This permits the air in chamber 68 (and thus in the air source 12) to pass through the outlet port 70 to the air driven unit 14, to operate the latter.

The above-described mechanism defines that feature of the invention combination which provides for the actuation of the valve assembly means 18 and thus of the pneumatic starter modulator 10. As may be seen, the invention modulator 10 provides an actuating valve means for use in an air driven system, wherein the actuating force required to operate the valve assembly is significantly reduced over that required to operate the whistle valve of prior art devices. This is provided by the configuration wherein both the front area $A_1$ of the first chamber 68 and the rear area $A_2$ of the second chamber 92 are exposed to the pressurized air from the air source 12, since the orifice 64 communicates with area $A_2$ which is larger than the front area $A_1$. The resulting force via area $A_2$ is greater than that resulting via area $A_1$, thus providing a differential loading force which keeps the valve body 36 closed.

To open the valve assembly, trigger means 20 is energized, which opens the trigger valve means 72 and exposes the second chamber 92 to a substantially lower pressure via the passages 74, 76, 80, 84, 82 and 90, causing a pressure reduction in the chamber 92. This causes valve body 36 to move to an open position in response to the supply pressure in the first chamber 68. Thus air from the air source 12 is introduced to the driven unit 14.

Since the trigger valve 72 is required to lower the pressure in chamber 92, the area to which it is exposed (i.e., the diameter of the communicating passages 74, 76 etc.) need only be slightly greater than the opening of orifice 64, to permit more air to escape from chamber 92 than can enter from chamber 68 via the orifice 64.

Regarding now the pressure regulating feature of the invention combination, the pressure delivered by the air source 12 may be greater than the pressure required via the outlet port 70 to operate the driven unit 14. In this situation, a pressure reduction is contemplated via the pressure regulator valve means 88 of the pneumatic starter modulator combination.

When trigger valve 72 is initially activated, air pressure in radial passage 80 communicates with the annular groove 84 of the valve means 88, and is also in communication with an annular lateral surface 94 of the regulator valve body 86 via an opening 96. The regulator valve body 86 reciprocates within a regulator valve housing 93 which is secured at one end to the end cover 42. The valve body 86 is generally retained within the housing 93 by means of a threaded set screw 95.

The air pressure acting on the annular lateral surface 94 moves the valve body 86 towards the right, as shown in the drawing, against the preload force of a regulator spring 98. As the body 86 moves further right, a land 100 thereof begins restricting the passage of air from passage 80 to passage 82. This restriction of passages 80, 82 causes a reduction in the flow of air to the outlet port 70 through the passage 90. The force of the spring 98 determines the axial position of the valve body 86 within the regulator valve housing 93, thereby determining in turn the air pressure acting on the rear area $A_2$ of the valve body 36. This latter pressure counteracts the pressure on the front area $A_1$, establishing a position of valve body 36 which provides a predetermined regulated pressure to the driven unit 14 via the outlet port 70.

Thus the pressure regulating means includes a pressure regulator valve means 88 moved by the pressure in the second chamber 92, when the trigger valve means 72 is opened, to restrict the flow of air and reduce the rate of pressure reduction in the second chamber 92. The valve means 88 thus establishes a position of the valve body 36 corresponding to a preselected regulated pressure in the outlet port 70, to provide the specific pressure to the driven unit 14.

Still another feature of the invention combination contemplates means for providing some form of conditioning fluid in selected amounts and at predetermined intervals, to the driving medium which is being passed through the valve assembly means 18. In applications such as air driven starting motors, etc., the conditioning fluid is often required. As only small amounts of the conditioning fluid are generally needed, injection thereof is conveniently accomplished by providing a conditioning valve mechanism 102 which injects the fluid into the pressurized air flow.

To this end, air pressure acting on the annular lateral surface 94 of regulator valve body 86 moves the latter against the force of the spring 98, causing the end of the body 86 to snugly enter a bore 104 in the extended end of the regulator valve housing 93. Conditioning fluid such as, for example, lubricating oil, is introduced to a chamber 106 formed in the cup-shaped member 52, via a feed passage 108, threaded at the outer end to receive a set screw 100.

The chamber 106 communicates with the bore 104 and an annulus 112, through a bore 115 in the housing end. When valve body 86 is urged towards sealed relation within the bore 104, conditioning fluid in the annulus 112 is trapped and compressed, causing a rise in the pressure of the fluid in the annulus 112. This fluid is in communication with a check valve 114 of the conditioning valve means 102 through a passage 116 formed in the valve body 86. The sudden rise of fluid pressure in the annulus 112 causes the check valve 114 to open for an instant, permitting a small amount of fluid to escape therethrough before the check valve 114 is closed by the combined action of the pressure acting on the annular lateral surface 94 and the force of a check valve spring 118. The small amount of conditioning fluid is forced into the passages communicating with the outlet port 70, thus permitting lubricating or conditioning fluid to be injected into the air flow which is being directed to the air driven unit 14.

Thus the conditioning valve means 102 contemplates a third (check) valve 114 communicating with a third chamber 106, wherein the valve 114 is adapted to open for relatively short periods in response to pressure acting on the regulating valve means 88, thereby supplying a predetermined amount of conditioning fluid to the driven unit 14.

When the switch 26 is opened (FIG. 1) the coil 28 of the solenoid means 22 is de-energized permitting the spring 32 to return the trigger valve 72 to the closed position. This permits a build-up of air pressure acting on the air area $A_2$, which along with the force of the spring 58, closes the valve body 36, shutting off the air flow from the chamber 68 to the outlet port 70.

What is claimed is:

1. A pneumatic starter modulator system including a source of pressurized fluid and a driven unit, further comprising the combination of;

valve assembly means operatively coupled between said source and said driven unit;

said valve assembly means including integral valve means disposed to cooperatively control the flow and the associated pressure of the pressurized medium delivered to the driven unit;

said integral valve means includes a differentially loaded valve and means exposed to the source pressure to maintain the valve in the closed position; trigger means operatively coupled to relieve pressure on said means exposed to the source pressure for maintaining said valve closed and thus open the valve in response to relatively less force than that experienced by the differentially loaded valve, variable pressure regulating valve means integral with said valve assembly means to vary the position of the differentially loaded valve when open to variably restrict the flow and thus the pressure of the medium from the source to the driven unit, and conditioning fluid injector valve means integral with said regulating valve means and including a body of conditioning fluid and operative to introduce a selected amount of conditioning fluid to the flow of medium responsive to movement of said regulating valve means.

2. The pneumatic modulator of claim 1 wherein said valve assembly means includes inner and outer housings;

said outer housing having an inlet communicating with said source and an outlet communicating with said driven unit;

said differentially loaded valve being reciprocally disposed in said outer housing to control flow between said inlet and said outlet, and defining a control chamber including said means exposed to said source pressure to maintain said valve closed;

control passage means including said trigger means selectively communicating said control chamber with said outlet;

said inner housing defining a conditioning chamber for containing said conditioning fluid; and, said conditioning fluid injector valve means operatively disposed to selectively communicate said conditioning chamber with said outlet.

3. The starter modulator of claim 2 wherein said pressure regulating valve means comprises a spool valve disposed in a bore intersecting said control passage means; and, said conditioning fluid injector valve means includes a check valve disposed in a passage in said spool valve in communication with said conditioning chamber and said control passage.

4. The pneumatic modulator of claim 3 wherein said conditioning fluid is a lubricant.

* * * * *